(12) United States Patent
Williams et al.

(10) Patent No.: US 7,693,147 B2
(45) Date of Patent: Apr. 6, 2010

(54) METHOD AND APPARATUS FOR REMOTELY MONITORING GAS TURBINE COMBUSTION DYNAMICS

(75) Inventors: George Edward Williams, Niskayuna, NY (US); Richard Frank Lazzuri, North Wales, PA (US); Eamon Patrick Gleeson, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 1271 days.

(21) Appl. No.: 10/407,874

(22) Filed: Apr. 4, 2003

(65) Prior Publication Data

US 2004/0199640 A1 Oct. 7, 2004

(51) Int. Cl.
- H04L 12/28 (2006.01)
- H04H 20/71 (2008.01)
- G06F 11/30 (2006.01)
- G06F 15/16 (2006.01)
- G05D 3/12 (2006.01)

(52) U.S. Cl. .............. 370/392; 370/312; 370/390; 702/184; 709/227

(58) Field of Classification Search ............ 370/401, 370/473, 474, 428–432, 241–252, 312–392; 709/203, 224–249; 700/286–290; 702/130–188
See application file for complete search history.

(56) References Cited

U.S. PATENT DOCUMENTS

| | | | |
|---|---|---|---|
| 5,673,322 A | 9/1997 | Pepe et al. | |
| 5,857,142 A * | 1/1999 | Lin et al. | 725/73 |
| 5,878,040 A * | 3/1999 | Peirce et al. | 370/389 |
| 6,061,349 A * | 5/2000 | Coile et al. | 370/389 |
| 6,118,472 A * | 9/2000 | Dureau et al. | 725/109 |
| 6,260,004 B1 * | 7/2001 | Hays et al. | 702/183 |
| 6,288,738 B1 | 9/2001 | Dureau et al. | |
| 6,445,704 B1 * | 9/2002 | Howes et al. | 370/392 |
| 6,542,856 B2 * | 4/2003 | Frantz et al. | 702/188 |
| 6,556,956 B1 * | 4/2003 | Hunt | 702/188 |
| 6,721,631 B2 * | 4/2004 | Shimizu et al. | 700/287 |
| 6,839,613 B2 * | 1/2005 | McCarthy et al. | 700/287 |
| 6,873,618 B1 * | 3/2005 | Weaver | 370/390 |
| 6,955,039 B2 * | 10/2005 | Nomura et al. | 60/39.27 |
| 6,990,432 B1 * | 1/2006 | McCarthy et al. | 702/184 |
| 6,998,955 B2 * | 2/2006 | Ballew et al. | 340/5.1 |
| 7,050,943 B2 * | 5/2006 | Kauffman et al. | 702/188 |
| 7,146,417 B1 * | 12/2006 | Coile et al. | 709/224 |
| 7,170,896 B2 * | 1/2007 | Battin | 370/401 |
| 7,249,191 B1 * | 7/2007 | Hutchison et al. | 709/236 |
| 7,307,956 B2 * | 12/2007 | Kaplan et al. | 370/238 |
| 7,369,520 B2 * | 5/2008 | Luoma et al. | 370/312 |
| 2002/0029097 A1 * | 3/2002 | Pionzio et al. | 700/286 |
| 2002/0114332 A1 * | 8/2002 | Apostolopoulos et al. | 370/392 |
| 2002/0118671 A1 * | 8/2002 | Staples et al. | 370/352 |
| 2002/0143951 A1 * | 10/2002 | Khan et al. | 709/227 |

(Continued)

Primary Examiner—Man Phan
(74) Attorney, Agent, or Firm—Armstrong Teasdale LLP

(57) ABSTRACT

Methods and systems for communicating information between a narrowband circuit and a broadband circuit for conserving bandwidth while monitoring gas turbine combustion dynamics are provided. The method includes receiving a stream of data through the narrowband circuit, splitting the stream of data into a plurality of data packets, and transmitting each of the data packets to a predetermined list of sockets through the broadband circuit. The system includes a narrowband network segment communicatively coupled to a broadband network segment, and a data network split/relay device communicatively coupled to the broadband network segment programmed to receive a stream of data from a server communicatively coupled to the narrowband segment.

24 Claims, 7 Drawing Sheets

U.S. PATENT DOCUMENTS

| | | | |
|---|---|---|---|
| 2003/0014219 A1* | 1/2003 | Shimizu et al. | 702/184 |
| 2003/0055975 A1* | 3/2003 | Nelson et al. | 709/227 |
| 2004/0066758 A1* | 4/2004 | Van Doren et al. | 370/329 |
| 2004/0264402 A9* | 12/2004 | Whitmore et al. | 370/328 |
| 2005/0240289 A1* | 10/2005 | Hoyte et al. | 700/49 |

* cited by examiner

METHOD AND APPARATUS FOR REMOTELY MONITORING GAS TURBINE COMBUSTION DYNAMICS

BACKGROUND OF THE INVENTION

This invention relates generally to communicating data via a network, and more particularly, to methods and apparatus for communicating gas turbine engine data via a network that includes a narrowband segment and a broadband segment.

Gas turbine engines typically include a compressor section, a combustor section, and at least one turbine section. The compressor compresses air, which is mixed with fuel and channeled to the combustor. The mixture is then ignited thereby generating hot combustion gases. The combustion gases are channeled to the turbine which extracts energy from the combustion gases for powering the compressor, as well as producing useful work to power a load, such as an electrical generator, or to propel an aircraft in flight.

The Dry Low NOx (DLN) operational techniques used in modern gas turbines have conflicting requirements of combustion stability, and nitrogen oxides (NOx) and carbon monoxide (CO) emission limits. A lean fuel/air mixture used by DLN technology fed into gas turbine combustors provides less NOx, but contributes to combustion instabilities. Accordingly, accurately determining the combustion dynamics of a gas turbine becomes very useful. Remote monitoring of gas turbines, especially industrial gas turbines, has become increasingly common. For example, technicians employed by a manufacturer of the gas turbine may remotely analyze information regarding the operation of the gas turbine and prescribe corrective steps, such as parts replacements or operation adjustments. On-site operators of the gas turbine may perform the replacement of parts and operation adjustments. Remotely analyzing and diagnosing data collected from a gas turbine and computing accurate information regarding the combustion dynamic levels of the gas turbine becomes a useful enabler for above activities.

At least some known gas turbines are located remotely from high-speed and broadband network access points. Consequently, data transmitted between local gas turbine engine control and monitoring systems may be routed through dial-up connections through existing telephone lines. Such connections are generally handled by a remote access server (RAS) that couples the dial-up user to a network. Such connections may be termed "narrowband", meaning only a limited amount of data may be transmitted through the connection, making the connection relatively slow for effective communications between the local control systems and remote workstations where tuning engineers may be monitoring the gas turbine engine operation. At least some known network architectures that include narrowband and broadband segments are susceptible to data pile-up and consequently lost data, especially in network systems using User Datagram Protocol (UDP).

BRIEF DESCRIPTION OF THE INVENTION

In one aspect, a method of communicating information between a narrowband circuit and a broadband circuit for conserving bandwidth between at least one server application coupled to the narrowband segment and a plurality of client applications communicatively coupled to the broadband segment is provided. The method includes receiving a stream of data through the narrowband circuit, splitting the stream of data into a plurality of data packets, and transmitting each of the data packets to a predetermined list of sockets through the broadband circuit.

In another aspect, a data network split/relay device is provided. The device is configured to receive data communication packets from a network, and includes a network input socket, a buffer configured to receive data from the network through the network input socket, and a microprocessor programmed to read buffered input data and send output data to a predetermined list of clients.

In yet another aspect, a gas turbine control system tuning system for transmitting control system tuning data between a local server and a remote client is provided. The system includes a narrowband network segment communicatively coupled to a broadband network segment, a data network split/relay device communicatively coupled to the broadband network segment programmed to receive a stream of data from a server communicatively coupled to the narrowband segment.

DETAILED DESCRIPTION OF THE INVENTION

While the methods and apparatus are herein described in the context of gas turbine engine control systems used in an industrial environment, it is contemplated that the herein described method and apparatus may find utility in other data network applications including, but not limited to, commercial applications. The description hereinbelow is therefore set forth only by way of illustration rather than limitation.

Figure 1:
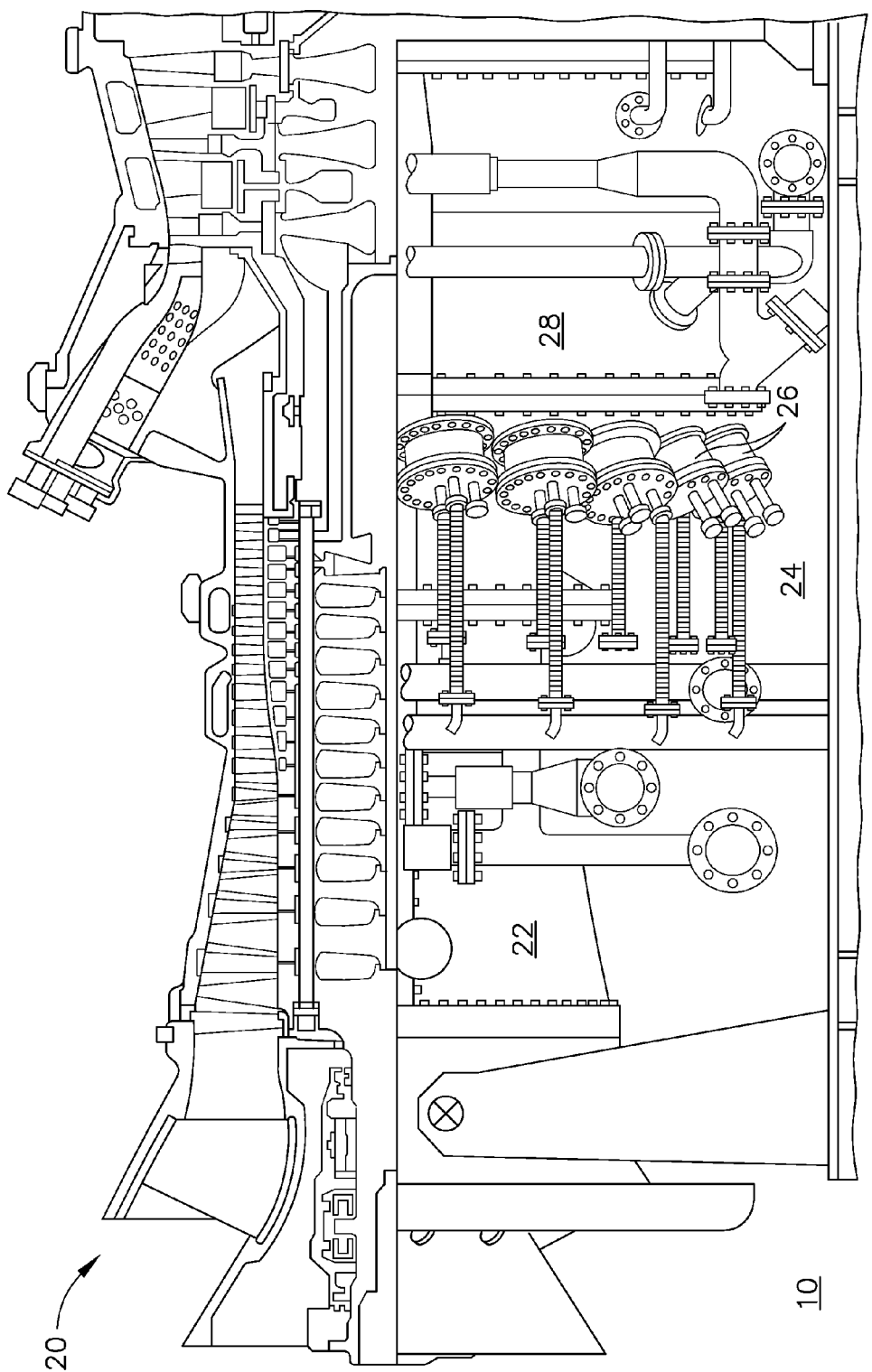
FIG. 1 is a side cutaway view of a gas turbine system that includes a gas turbine.

FIG. 1 is a side cutaway view of a gas turbine system 10 that includes a gas turbine 20. Gas turbine 20 includes a compressor section 22, a combustor section 24 including a plurality of combustor cans 26, and a turbine section 28 coupled to compressor section 22 using a shaft (not shown).

In operation, ambient air is channeled into compressor section 22 where the ambient air is compressed to a pressure greater than the ambient air. The compressed air is then channeled into combustor section 24 where the compressed air and a fuel are combined to produce a relatively high-pressure, high-velocity gas. Turbine section 28 is configured to extract and the energy from the high-pressure, high-velocity gas flowing from combustor section 24. The combusted fuel mixture produces a desired form of energy, such as, for example, electrical, heat and mechanical energy. In one embodiment, the combusted fuel mixture produces electrical energy measured in kilowatt-hours (kWh). However, the present invention is not limited to the production of electrical energy and encompasses other forms of energy, such as, mechanical work and heat. Gas turbine system 10 is typically controlled, via various control parameters, from an automated and/or electronic control system (not shown) that is attached to gas turbine system 10.

Figure 2:
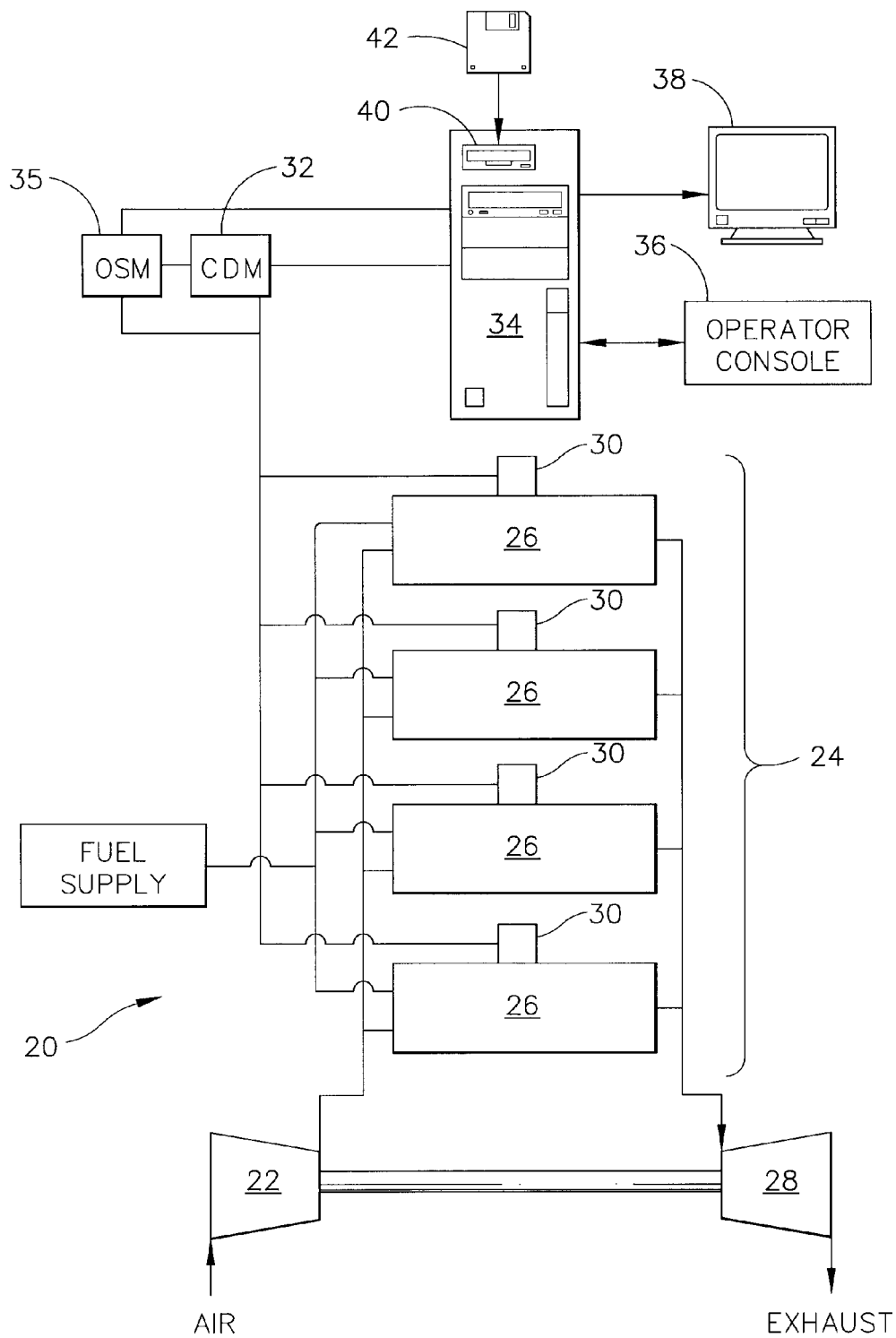
FIG. 2 is a schematic illustration the gas turbine system shown in FIG. 1.

FIG. 2 is a simplified schematic illustration of gas turbine system 10 shown in FIG. 1. Gas turbine system 10 also includes a plurality of sensors 30 electrically coupled to gas turbine 20. A combustion dynamics monitor (CDM) 32 samples analog data from sensors 30 and converts the analog data to digital signals for subsequent processing. A computer 34 receives the sampled and digitized sensor data from at least one of CDM 32 and an onboard system monitor (OSM) 35, and performs high-speed data analysis. OSM 35 may also include a PI/UDP turbine control system data server that executes on OSM 35 to transmit control system data to through a network. Although only four combustor cans 26 are shown, it should be realized that gas turbine engine 20 can include more or less than four combustor cans 26, for example, in one exemplary embodiment, gas turbine engine 20 includes twenty-seven combustor cans 26.

Computer 34 receives commands from an operator via a keyboard 36. An associated monitor 38 such as, but not limited to, a liquid crystal display (LCD) and a cathode ray tube, allows the operator to observe data received from computer 34. The operator supplied commands and parameters are used by computer 34 to provide control signals and information to CDM 32 and OSM 35.

In one embodiment, computer 34 includes a device 40, for example, a floppy disk drive, CD-ROM drive, DVD drive, magnetic optical disk (MOD) device, or any other digital device including a network connecting device such as an Ethernet device for reading instructions and/or data from a computer-readable medium 42, such as a floppy disk, a CD-ROM, a DVD or an other digital source such as a network or the Internet, as well as yet to be developed digital means. In another embodiment, computer 34 executes instructions stored in firmware (not shown). Computer 34 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

Figure 3:
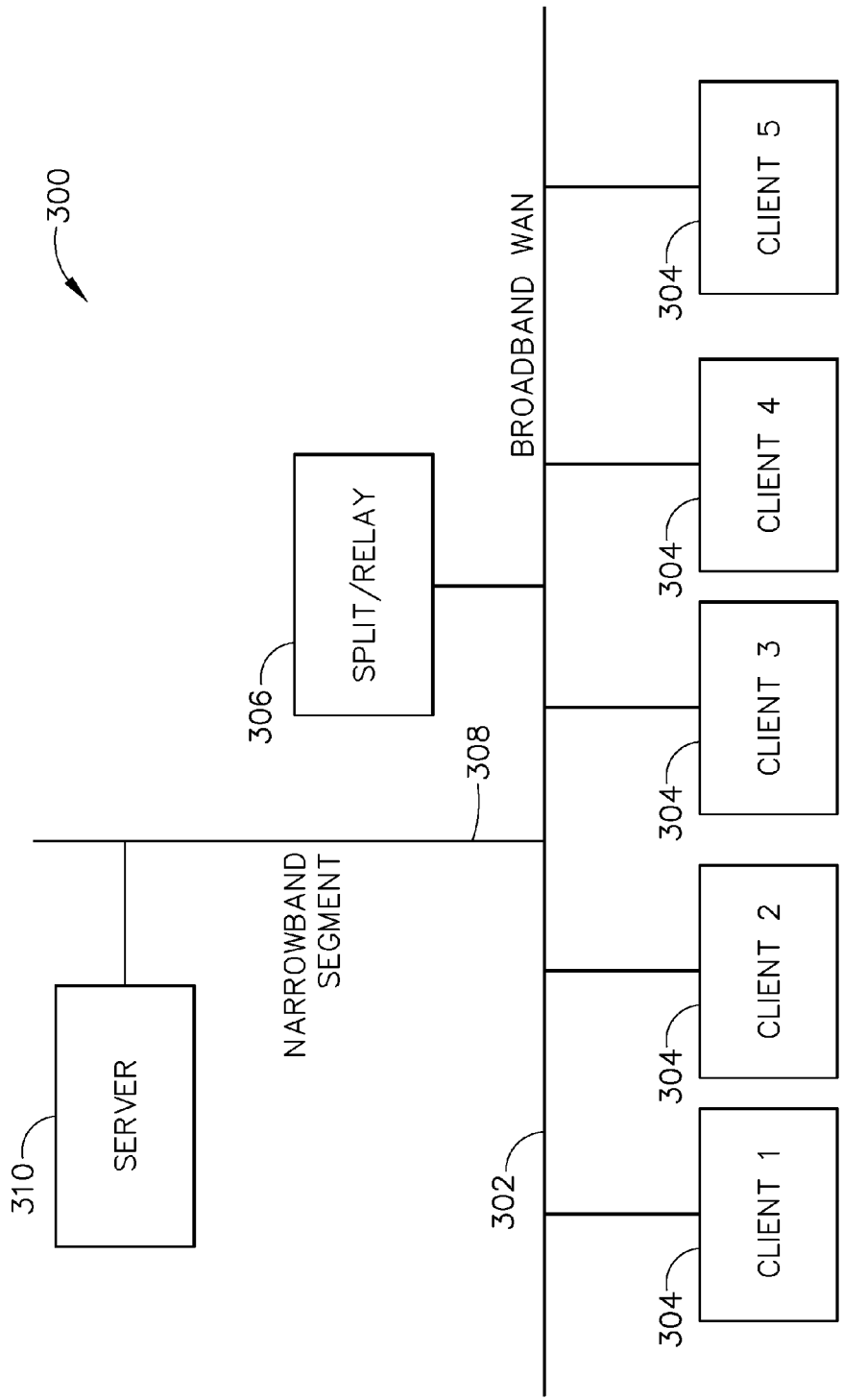
FIG. 3 is a schematic illustration of an exemplary network architecture that may be used with the combustion dynamics monitor (CDM) and the onboard system monitor (OSM) shown in FIG. 2.

FIG. 3 is a schematic illustration of an exemplary network architecture 300 that may be used with combustion dynamics monitor (CDM) 32 and onboard system monitor (OSM) 35 (shown in FIG. 2). The network includes a broadband segment communicatively coupled to at least one client application 304. In the exemplary embodiment, broadband segment 302 is a private intranet for communicating gas turbine control system tuning information between remote turbine sites and tuning engineers located at a home office or other remote turbine sites. In an alternative embodiment, broadband segment 302 is the Internet. A Split/Relay device 306 and a narrowband network segment 308 are also communicatively coupled to broadband segment 302. A server 310 is coupled to narrowband segment 308. In the exemplary embodiment, narrowband segment 308 is a remote access server and server 310 is onboard system monitor (OSM) 35 and/or combustion dynamics monitor (CDM) 32.

In operation, OSM 35 and CDM 32 monitor turbine operating parameters locally. For tuning OSM 35 and CDM 32, a dial-up connection is established with narrowband segment 308 from OSM 35 and CDM 32. In the exemplary embodiment, clients 304 are monitoring workstations located remotely from the turbine being tuned. At a remote location, a tuning engineer is able to monitor the gas turbine operation from a client 304 configured as a tuning workstation. The tuning engineer then communicates tuning instructions to a technician located at the turbine engine. Data received by OSM 35 and CDM 32 is transmitted through narrowband segment 308 as a stream of data. Split/Relay 306 receives the data stream into a buffer, splits the stream into data packets which may then be transmitted to a predetermined list of clients through broadband segment 302. In the exemplary embodiment, a User Datagram Protocol (UDP) protocol is used to transmit the data packets. Split/Relay 306 monitors it's input socket to listen for incoming traffic, when traffic from narrowband segment 308 arrives it is read into a buffer where it is read and then packetized for transmission to a list of clients. The packet is transmitted to each respective client output socket, wherein when the end of the client list is reached, Split/Relay 306 reinitializes the client list and waits for a next input data stream to arrive. In the exemplary embodiment, Split/Relay 306 reads the received data to determine if the data header includes a source identifier, such as, but not limited to a turbine serial number. If a source identifier is found, Split/Relay 306 does not insert a source IP address into the outgoing data packet. If no source identifier is found, Split/Relay 306 inserts a source server IP address to each data packet prior to transmitting the packet through broadband segment 302. Each client 304 may then read the source identifier or the source server IP address in each data packet and discard any message that is not from a source from which client 304 is expecting communications.

Figure 4:
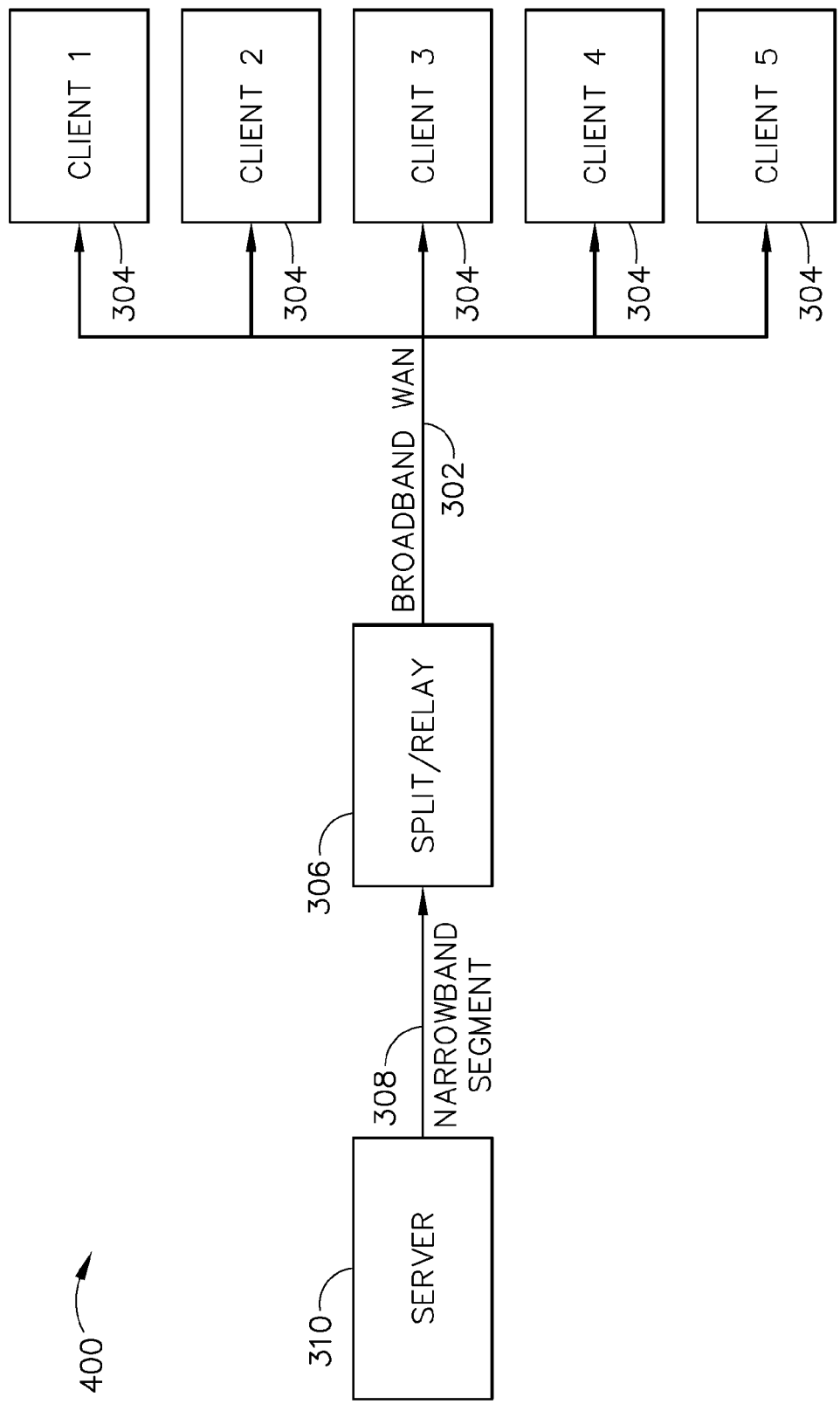
FIG. 4 is a data flow diagram illustrating an exemplary flow of data through network architecture shown in FIG. 3.

FIG. 4 is a data flow diagram 400 illustrating an exemplary flow of data through network architecture 300 (shown in FIG. 3). Data received from servers 310, for example OSM 35 and CDM 32, is transmitted through narrowband segment 308, such as a dial-up connection to a RAS. The stream of data is received by Split/Relay device 306, packetized into data packets, and transmitted to a list of clients 304 though broadband segment 302 using UDP. In the exemplary embodiment, each data packet includes a source IP address. Each data packet is received by each client in the client list. In the exemplary embodiment, client 304 reads the source IP address and discards packets from a source from which it is not expecting communications. Data received by client 304 is utilized to display the turbine engine operational parameters and mimic displays of turbine engine systems for the tuning engineer.

Figure 5:
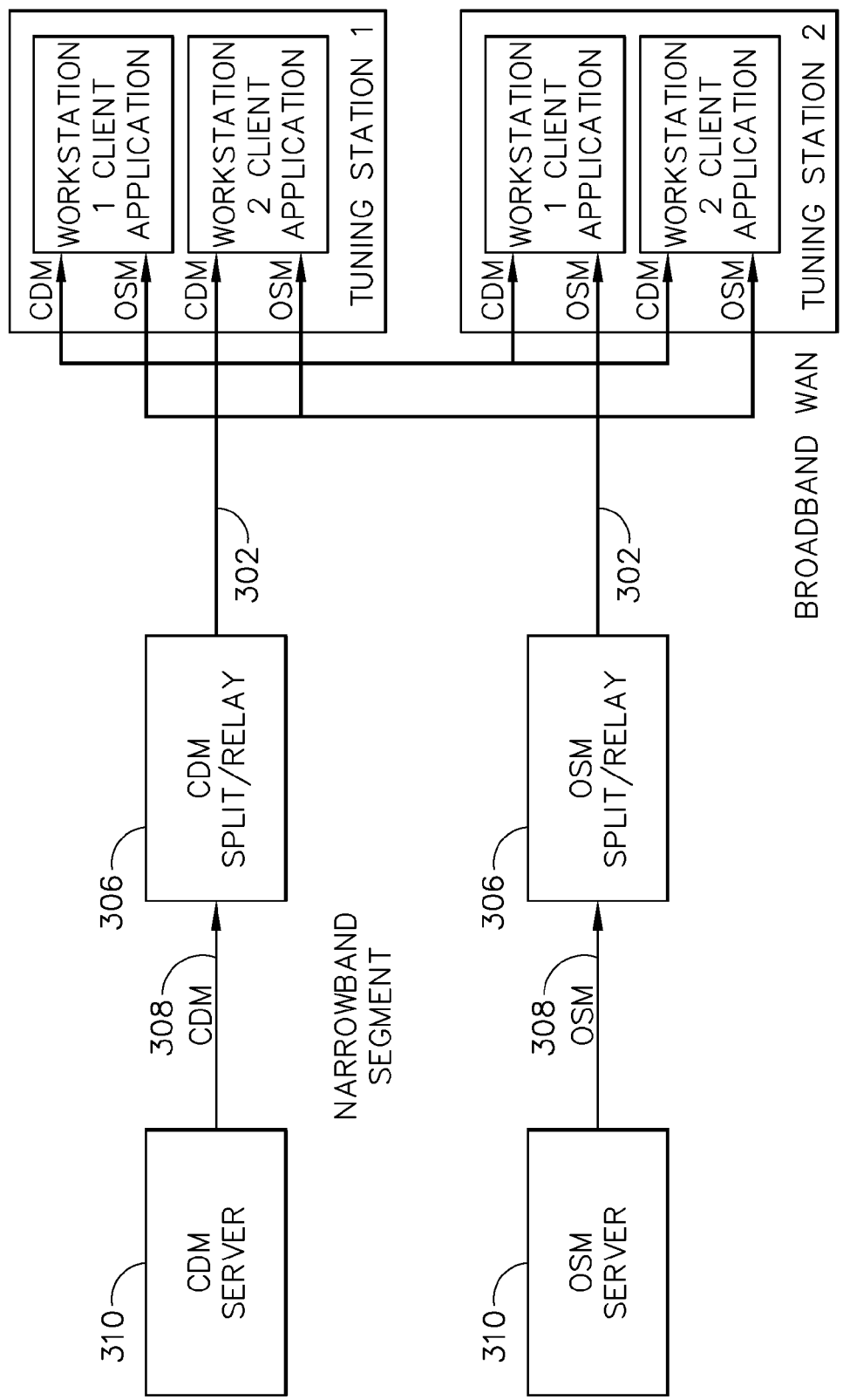
FIG. 5 is a data flow diagram illustrating an exemplary flow of data through an alternate network architecture that may be used with the combustion dynamics monitor (CDM) and onboard system monitor (OSM) shown in FIG. 2.

FIG. 5 is a data flow diagram 500 illustrating an exemplary flow of data through an alternate network architecture that may be used with combustion dynamics monitor (CDM) 32 and onboard system monitor (OSM) 35 (shown in FIG. 2). In the alternative network architecture each of OSM 35 and CDM 32 includes a respective server 310, RAS connection 308 to broadband segment 302, and each includes a respective Split/Relay 306, which inserts a data source identifier, such as a source server IP address into the data stream. In one embodiment, servers 310 insert the data source identifier, such as, the source turbine serial number, into the data stream. When source server 310 inserts the data source identifier into the data stream, Split/Relay 306 does not insert a data source identifier into the data.

Figure 6:
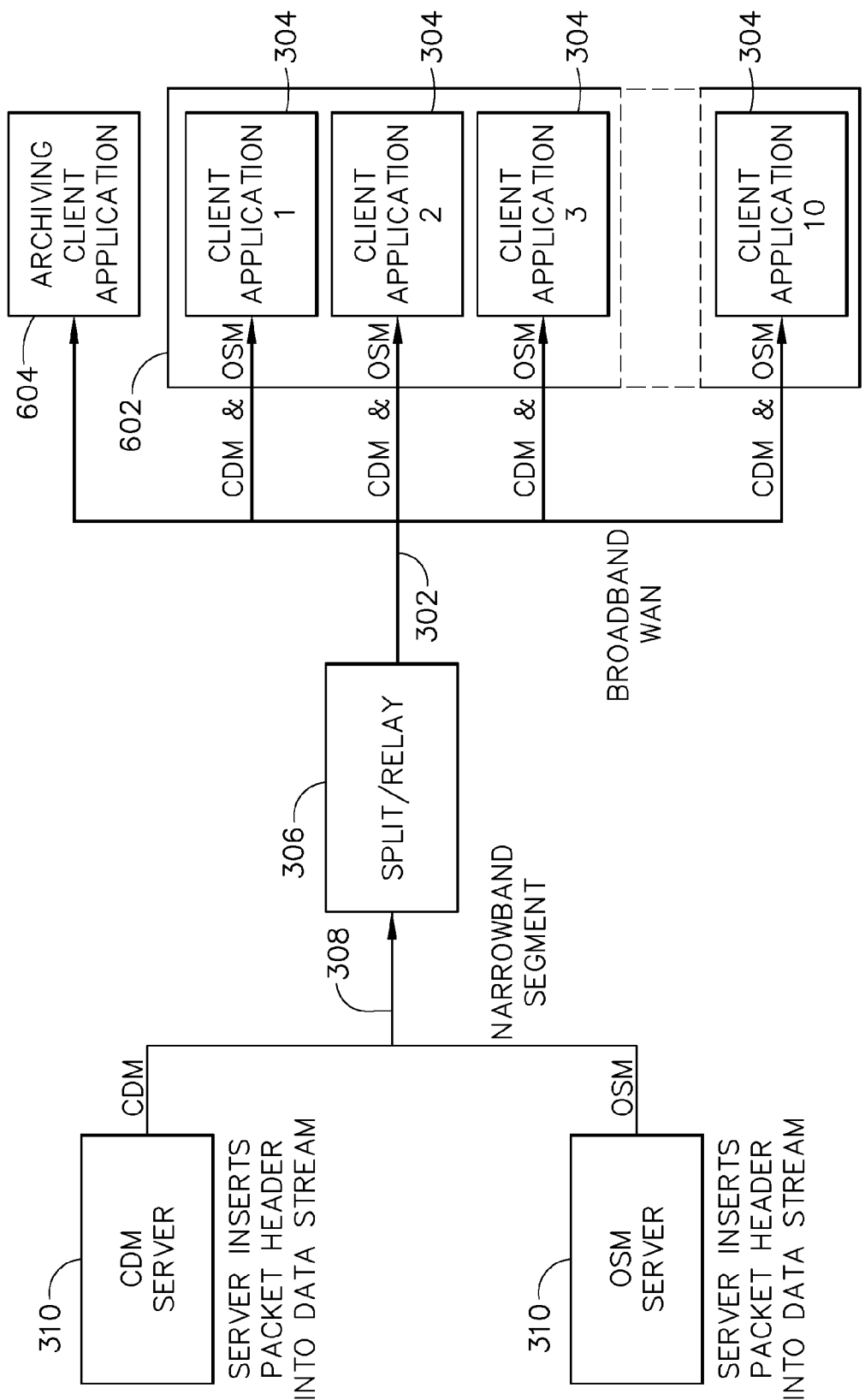
FIG. 6 is a data flow diagram illustrating an exemplary flow of data through another alternative network that may be used with the combustion dynamics monitor (CDM) and the onboard system monitor (OSM) shown in FIG. 2.

FIG. 6 is a data flow diagram illustrating an exemplary flow of data through another alternative network that may be used with combustion dynamics monitor (CDM) 32 and onboard system monitor (OSM) 35 (shown in FIG. 2). In the exemplary embodiment, each of OSM 35 and CDM 32 has a respective server 310 that inserts a packet header into the outgoing data stream. The packet header may include a data source identifier, such as, a source turbine serial number. Each server transmits it's respective data stream to a single Split/Relay 306 through broadband segment 302 wherein Split/Relay 306 splits each data stream into data packets, and transmits the data packets to a list of clients 304. In the exemplary embodiment, a terminal server 602 hosts at least one client 304. An archiving agent client application 604 is communicatively coupled to broadband segment 302 to receive tuning instructions for storing and future reference.

Figure 7:
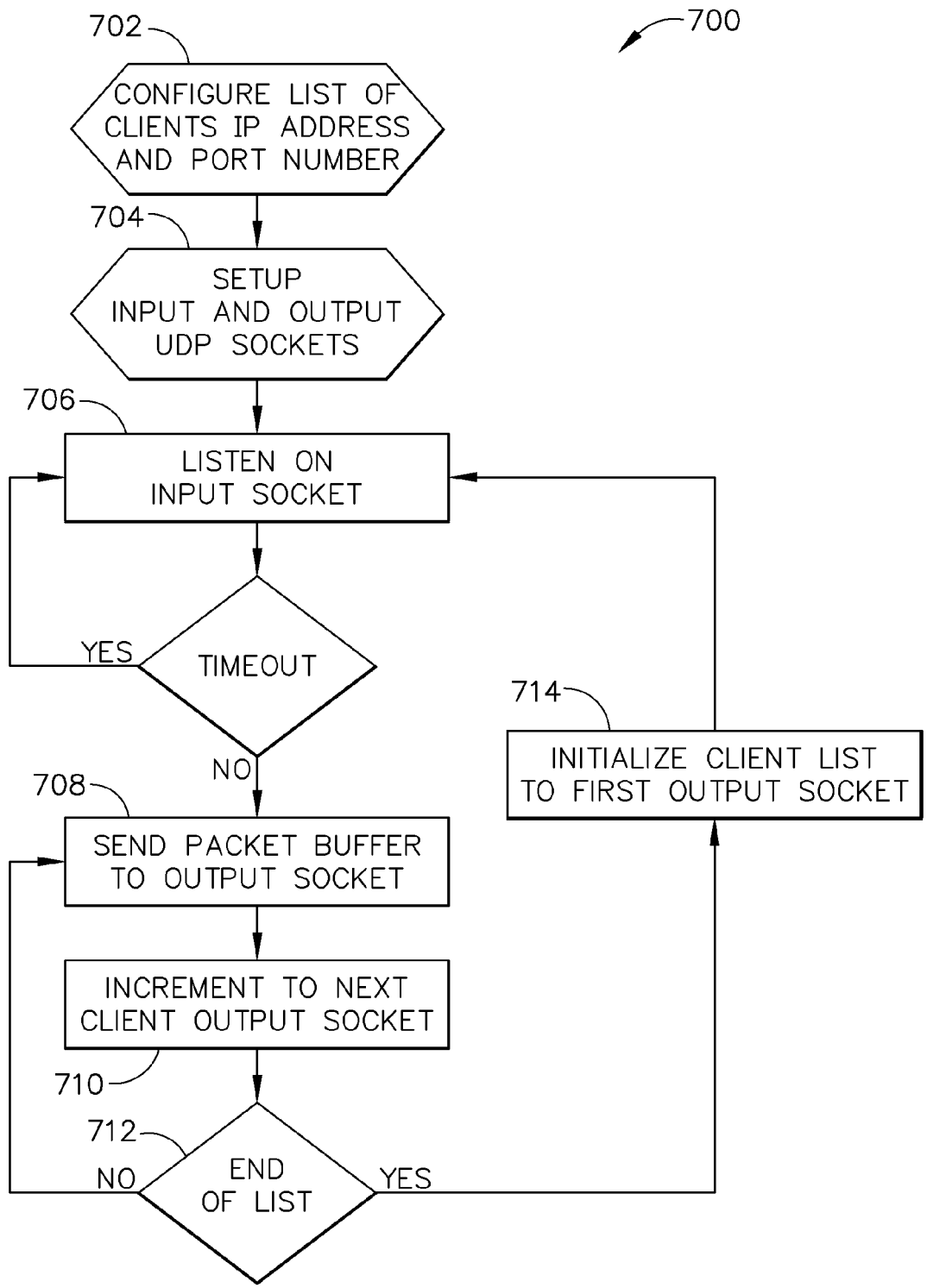
FIG. 7 is a flowchart illustrating an exemplary method of splitting and relaying data by Split/Relay shown in FIG. 3.

FIG. 7 is a flowchart illustrating an exemplary method 700 of splitting and relaying data by Split/Relay 306 (shown in FIG. 3). Method 700 includes configuring 702 a list of client IP address and port number that Split/Relay 306 will use to transmit data packets. Split/Relay 306 sets-up 704 input and output UDP sockets. In an alternative embodiment, the data transmission protocol is TCP/IP. Split/Relay 306 then waits 706 for an input data transmission, when a data stream is received, it is stored in a buffer where it is packetized for transmission 708 to clients 304. In one embodiment, a data source identifier, such as, but not limited to, a source server IP address is inserted into the data packet in the buffer prior to transmitting the data packet to clients 304. In an alternative embodiment, each server sending a data stream to Split/Relay 306 includes a header that includes the source turbine serial number. Using the data source identifier, each client is later able to filter out unsolicited data packets from servers and/or turbine control systems it is not expecting communications from. The packetized data is sent to each client in the client list by Split/Relay 306 incrementing 710 to a next client output socket and transmitting 708 the data packet until an end of list is reached 712. Split/Relay 306 then reinitializes 714 the client list to the first output socket and waits for a next input data stream to be received.

The above-described methods and systems provide a cost-effective and reliable means for monitoring and tuning combustion dynamics of a gas turbine engine. More specifically, the methods and systems facilitate transmitting tuning information from a remotely located gas turbine engine server, coupled to a narrowband network segment, to a tuning workstation client coupled to a broadband network segment. As a result, the methods and systems described herein facilitate maintaining gas turbine engines in a cost-effective and reliable manner.

While the present invention is described with reference to transmitting gas turbine engine tuning data through narrowband and broadband network segments that are communicatively coupled, numerous other applications are contemplated. For example, it is contemplated that the present invention may be applied to any system wherein a device coupled to a narrowband network segment, such as, but not limited to, a remote access server (RAS) dial-up PPP connection is used to communicate with devices coupled to a broadband network segment, such as, but, not limited to, the Internet, a private Intranet, and/or a WAN.

Exemplary embodiments of gas turbine engine tuning systems and communications systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of communicating information between a narrowband circuit and a broadband circuit for conserving bandwidth, said method comprising:
   receiving a stream of data through the narrowband circuit;
   splitting the stream of data into a plurality of data packets for transmission to a client list;
   extracting socket data from the received stream of data;
   determining a destination address for each packet in the received stream of data;
   inserting, if the received stream of data does not include a data source identifier in a data header, a source server IP address into each data packet of the plurality of data packets;
   transmitting each of the data packets to one or more of selected sockets and to the destination address through the broadband circuit; and
   reinitializing the client list for the next stream of data.

2. A method in accordance with claim 1 wherein receiving a stream of data comprises receiving a stream of data from a server application.

3. A method in accordance with claim 2 wherein receiving a stream of data comprises receiving a buffer of data from a User Datagram Protocol (UDP) socket.

4. A method in accordance with claim 1 wherein receiving a stream of data comprises receiving a stream of data from a server application that includes a source turbine serial number in the data header.

5. A method in accordance with claim 3 wherein receiving a stream of data comprises receiving a stream of data from at least one of a combustion dynamics monitor server and a PI/UDP turbine control system server.

6. A method in accordance with claim 1 wherein determining a destination address comprises determining a destination from a list of client addresses.

7. A method in accordance with claim 1 wherein the data source identifier is a source turbine serial number.

8. A method in accordance with claim 1 wherein communicating information comprises communicating gas turbine engine tuning information.

9. A method of communicating gas turbine tuning information between a narrowband circuit and a broadband circuit for conserving bandwidth between at least one server application and a plurality of client applications wherein at least one client application includes an archiving client application, said method comprising:
   receiving a stream of data through the narrowband circuit;
   splitting the stream of data into a plurality of data packets for transmission to a client list;
   inserting, if the received stream of data does not include a data source identifier in a data header, a source server IP address into each data packet of the plurality of data packets;
   transmitting each of the data packets to selected sockets through the broadband circuit;
   transmitting data packets that include tuning data to the archiving client application; and
   reinitializing the client list for the next stream of data.

10. A data network split/relay device configured to receive data communication packets from a network, said device comprising:
    a network input socket;
    a network output socket;
    a buffer configured to receive a stream of data from a narrowband segment of the network through said network input socket and to split the data into a plurality of data packets for transmission to a client list over a broadband segment of the network; and a microprocessor programmed to read buffered input data, send output data to selected clients through said network output socket, and to reinitialize a client list for the next received data, said microprocessor is further programmed to insert a source server IP address into each data packet of the plurality of data packets if the stream of data does not include a data source identifier.

11. A data network split/relay device in accordance with claim 10 wherein said network output socket transmits each data packet through a broadband network connection.

12. A data network split/relay device in accordance with claim 11 wherein said broadband network connection is a private intranet connection.

13. A data network split/relay device in accordance with claim 10 wherein said network data packets are sent via User Datagram Protocol (UDP) protocol.

14. A data network split/relay device in accordance with claim 10 wherein said microprocessor is further programmed to:

configure a list of client IP address and port number;

setup input and output UDP sockets; and transmit packet buffer to output socket.

15. A data network split/relay device in accordance with claim 10 wherein said data source identifier is a turbine serial number.

16. A gas turbine control system tuning system for transmitting control system tuning data between a local server and a remote client, said system comprising:

a narrowband network segment communicatively coupled to a broadband network segment; and a data network split/relay device communicatively coupled to said broadband network segment and programmed to receive a stream of data from said server communicatively coupled to the narrowband segment, to split the stream of data into a plurality of data packets for transmission to a client list, and to reinitialize the client list for the next stream of data, said data network split/relay device is further programmed to insert a source IP address into each data packet of the plurality of data packets if the stream of data does not include a data source identifier.

17. A tuning system in accordance with claim 16 wherein said data network split/relay device is further programmed to transmit data packets to client applications communicatively coupled to the broadband segment.

18. A tuning system in accordance with claim 16 wherein said data source identifier is a turbine serial number.

19. A tuning system in accordance with claim 16 wherein said narrowband segment is a remote access server.

20. A tuning system in accordance with claim 16 wherein said broadband segment is one of a private Intranet and the Internet.

21. A tuning system in accordance with claim 16 wherein said local server is at least one of a combustion dynamics monitor and an onboard system monitor.

22. A tuning system in accordance with claim 16 wherein said remote client is one of a tuning workstation and an archiving agent.

23. A gas turbine control system tuning system for transmitting control system tuning data between at least one of a combustion dynamics monitor and an onboard system monitor, and at least one of a tuning remote client and an archiving agent, said system comprising:

a remote access server communicatively coupled to a broadband network segment;

a narrowband network segment communicatively coupled to said broadband network segment; and a data network split/relay device communicatively coupled to said broadband network segment, said split/relay device programmed to receive a stream of data from a server communicatively coupled to said narrowband segment, and to split the stream of data into a plurality of data packets for transmission to a client list, said split relay device further programmed to insert a source IP address into each data packet of the plurality of data packets if the stream of data does not include a data source identifier.

24. A tuning system in accordance with claim 23 wherein said split/relay device is further programmed to transmit data packets to a client server through the broadband segment.

* * * * *